United States Patent [19]

Bergeron

[11] 4,277,263

[45] Jul. 7, 1981

[54] AIR AND ROCK PARTICLE SEPARATOR WITH SPIRAL DEFLECTORS

[76] Inventor: Willard Bergeron, 478 Surprenant St., Drummondville, Quebec, Canada, J2C 4J3

[21] Appl. No.: 23,738

[22] Filed: Mar. 26, 1979

[51] Int. Cl.³ .......................................... B01D 39/10
[52] U.S. Cl. .................................. 55/282; 55/323; 55/325; 55/485; 55/487; 55/524; 55/525; 175/206
[58] Field of Search ................. 55/261, 282, 323, 325, 55/332, 432, 485, 487, 524, 525, 96; 175/206; 261/112, DIG. 72

[56] References Cited

U.S. PATENT DOCUMENTS

| | | | |
|---|---|---|---|
| 3,307,336 | 3/1967 | Dewsberry | 55/432 X |
| 3,446,906 | 5/1969 | Zulauf | 55/524 X |
| 3,763,633 | 10/1973 | Soltis | 55/525 X |
| 3,880,626 | 4/1975 | Griwatz et al. | 55/525 X |
| 3,910,360 | 10/1975 | Sundstrom | 55/96 X |
| 3,913,890 | 10/1975 | Lankenau et al. | 261/DIG. 72 |

FOREIGN PATENT DOCUMENTS

| | | | |
|---|---|---|---|
| 789409 | 10/1935 | France | 261/112 |
| 464433 | 4/1937 | United Kingdom | 261/112 |

*Primary Examiner*—Richard L. Chiesa
*Attorney, Agent, or Firm*—Larson and Taylor

[57] ABSTRACT

A separator for use in separating air-born rock material from air. The separator comprises a housing defining a generally horizontal air flow path with at least one set of spiral deflector bands within the housing extending across the flow path. Each band preferably comprises a twisted strip of material which is resilient, but the strip can also be made from rigid or flexible material.

6 Claims, 3 Drawing Figures

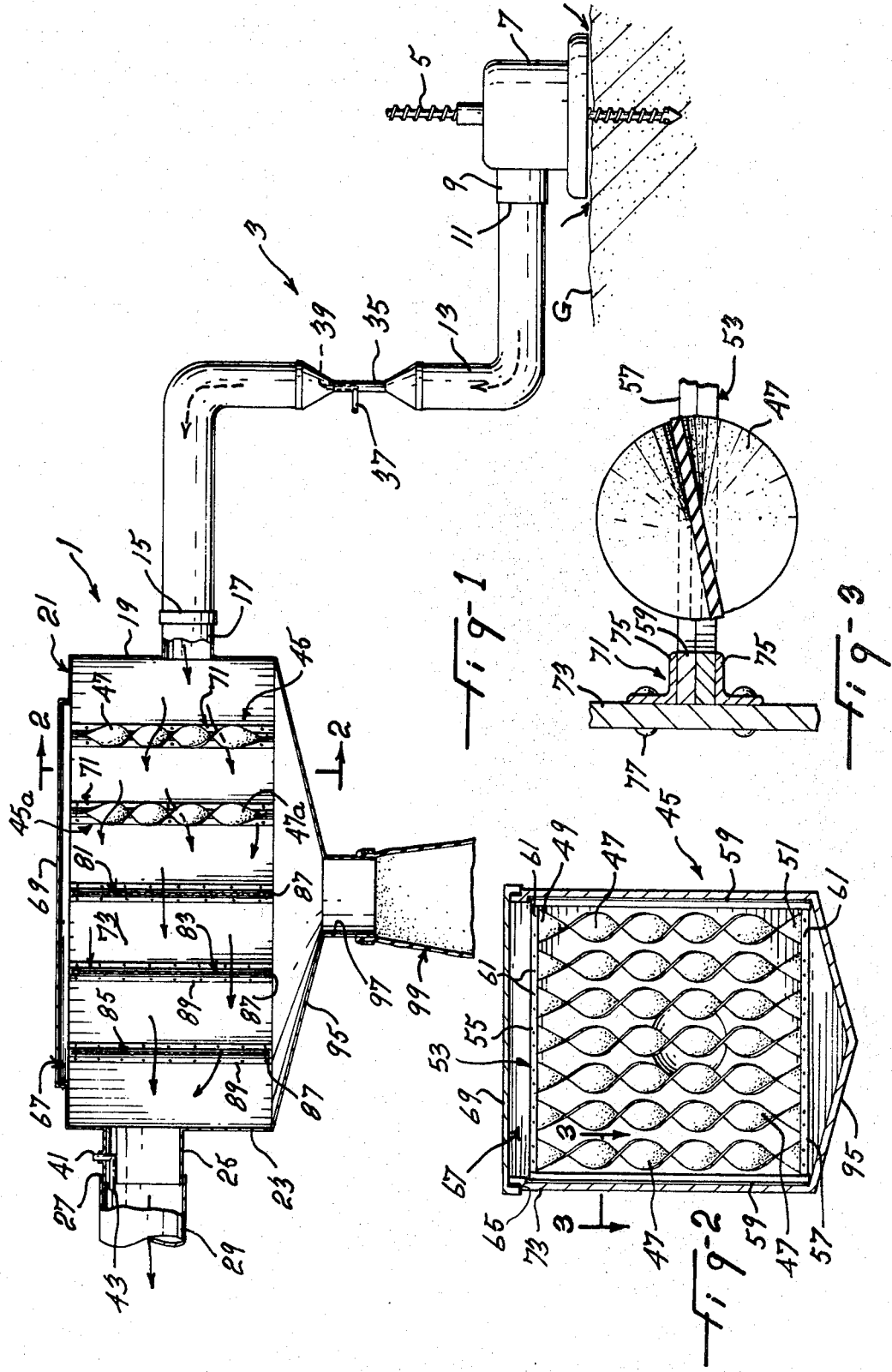

AIR AND ROCK PARTICLE SEPARATOR WITH SPIRAL DEFLECTORS

This invention is directed toward a separator.

The invention is more particularly directed toward a separator for separating air-born rock material from air.

In known separating systems, for separating heavy material, such as rock particles, from air, an air flow carrying the rock particles is set up. Rigid baffles are placed to extend across at least part of the air flow to intercept the heavier particles and thus deflect them out from the air flow. While the baffle-type separator works effectively, frequent maintenance is needed. The baffles quickly wear out due to the abrasive action of the rock particles and the high velocity air flow required to transport the rock particles. Thus the baffles must be frequently replaced resulting in down time for the drilling or crushing apparatus. This apparatus, during operation, creates the rock particle environment requiring cleaning.

Other known separating systems employ cyclone-type recleaners to eliminate the heavier rock particles. These devices are not too efficient however, and a relatively large amount of dust and particle matter must still be filtered out after cyclone treatment thereby requiring bulky apparatus which is undesirable.

The known separating systems also have difficulty in operating under conditions where the rock particles and dust are wet. The known systems quickly become clogged with the wet material requiring frequent shut-downs for cleaning, or else requiring elaborate and thus costly cleaning devices.

It is therefore the object of the present invention to provide an improved separator which is more durable in operation thus requiring less maintenance and making it cheaper to operate. It is another purpose of the present invention to provide an improved separator for separating rock particles and dust from air which separator is more efficient than known separators thereby providing for more compact separation systems. It is a further purpose of the present invention to provide a separator apparatus which self-cleans more efficiently than known devices and thus is better able to handle damp or wet operating conditions.

In accordance with the present invention, a separator is provided having spiral, deflector means which intercepts the air stream carrying the rock particles. The spiral deflector means directly intercepts some of the rock particles carried by the air stream deflecting them out of the air stream path direction. In addition the spiral shape of the deflector means creates a turbulence in the air flow which further, indirectly, increases the separating action.

The deflector means comprises a set of spirally twisted bands. The bands are slightly spaced-apart and are mounted in a plane generally perpendicular to the air flow path to directly intercept some of the rock particles and dust in the air flow path. The separator preferably includes a plurality of screens behind the spiral deflector means for removing at least some of the dust from the air flow.

The spiral bands can be made rigid. In a preferred embodiment however, the bands are made resilient. When made resilient, the bands "give" slightly when struck by rock particles in the air stream thus increasing the operational life of the bands. In addition, the "giving" action provides a measure of self-cleaning for the deflector means. The resilient bands vibrate when struck by rock particles, shaking off dust particles which might otherwise accumulate on the bands, particularly if the dust particles were damp or wet.

The invention is particularly directed toward a separator for use in separating air-born rock material from air. The separator has a housing for defining a generally horizontal air flow path with an inlet at one end of the housing and an outlet at the other end of the housing. Spiral deflector means are provided in the housing extending across air flow path to intercept heavier rock material in its passage through the housing in the air flow path.

The spiral deflector means comprise at least one set of spirally twisted bands extending in a plane generally perpendicular to the air flow path.

The bands in a preferred embodiment, are made from resilient material such as rubber.

The invention will now be described in detail having reference to the accompanying drawings in which:

FIG. 1 is a schematic illustration of a rock drilling system incorporating the separator of the present invention;

FIG. 2 is a cross-section view taken along line 2—2 of FIG. 1; and

FIG. 3 is a cross-section view taken along line 3—3 of FIG. 2.

The separator of the present invention can be used in different rock handling environments, such as rock crushing or rock conveying systems. However, the preferred environment is a rock drilling system.

As shown in FIG. 1, the separator 1 forms part of a rock drilling system 3 which system includes a rock drill 5 with a collector hood 7 positioned about the drill and resting just above the ground "G" in which a hole is being drilled by drill 5. The hood 7 has a lateral outlet 9 to which is connected one end 11 of a flexible pipe or conduit 13. The other end 15 of the conduit 13 is connected to an inlet 17 in one end wall 19 of the housing 21 of the separator 1. The other end wall 23 of the housing 21 has an outlet 25. One end 27 of a conduit 29 is fixed to outlet 25. The conduit 29 can lead to another separator (not shown) which removes fine rock material from the air flow which material is not removed in separator 1.

Suitable means are provided for causing air and rock material to flow through the system 3. The flow causing means can include a restricted section 35 in conduit 13. An air pipe 37 is mounted in section 35 with its outlet end 39 facing downstream toward separator 1. High pressure air is fed from a suitable supply (not shown) through pipe 37 to create a venturi effect in section 35 and aid air flow through the system. A second air pipe 41 can be mounted in outlet 25 of separator 1 with its outlet end 43 facing away from end wall 23 of housing 21 to provide a further venturi effect to assist air flow through the system. The air flow through the system draws air into the collector 7 under its edge and through the conduits 13, 29 and separator 1. This air flow, shown by the arrows, carries with it rock particles, formed during drilling, from the collector 7. Suitable fan means can be used instead of, or with, pipes 37, 41, to provide, or assist, air flow.

The separator 1 of the present invention has its housing 21 defining an air and rock material flow path between the inlet 17 and outlet 25 which path is generally horizontal. Spiral deflector means 45 are mounted within the housing to extend across the flow path.

These spiral deflector means 45 are preferably mounted near the inlet end wall 19 of the housing 21 and comprise at least one set of spirally twisted bands 47 extending across the flow path. The bands 47 can be stiff and rigid, made from suitable material such as steel. Preferably however, the bands 47 are made from a resilient material such as rubber. The bands are arranged parallel to each other with a slight spacing between adjacent bands. Each band 47 is mounted at its ends 49, 51 to a frame 53. Frame 53 has a top support 55, a bottom support 57 parallel to top support 55, and side supports 59 extending between the top and bottom supports. Each band 47 is fastened at one end 49 by suitable fastening means 61 to top support 55. The other end 51 of the resilient band 47 is then rotated three to six times to spirally twist the band, and then the other end 51 is fastened by suitable fastening means 61 to bottom support 57.

The frame 53, carrying the mounted, twisted bands 47, is then itself mounted within the separator 1 to provide the spiral deflector means 45. Preferably the top wall 65 of housing 21 is provided with an access opening 67 closed by a cover 69. Frame mounting means 71 are provided on each sidewall 73 of housing 21. Each frame mounting means 71 can comprise a pair of spaced-apart angle members 75 fastened to housing wall 73 with suitable fastening means 77. The spaced-apart angle members 75 provide a slot in which one side 59 of the frame 53 snugly fits to mount the frame, and thus the bands 47, generally vertically, and in a plane generally perpendicular to the flow path. The mounting means 71 are near the one end wall 19 of the housing 21 to position the deflector means 45 close to the inlet 17.

A set of wire screens 81, 83, 85 can be removably mounted down-stream of the deflector means 45 within the housing 21. The screens 81, 83, 85 are spaced apart from each other. The upstream screen 81 has a coarse mesh, the middle screen 83 has a medium mesh, and the downstream screen 85 has a fine mesh. The screens 81, 83, 85 are each mounted in the same manner as the bands 47 using frame means 87 similar to frame 53 and mounting means 89 similar to mounting means 71.

The bottom wall 95 of the separator housing 21 slopes down slightly toward a central opening 97 which opening is closed by a suitable standard valve 99. Valve 99 can for example comprise a rubber valve, the walls of which remain closed until the weight of material collected above the valve forces the walls apart to discharge material through the opening 97. More than one bottom opening can be employed if desired.

When an air flow is set up during drilling through the system 3, including the separator 1, the spiral deflector means 45, in the air flow path, creates turbulence. As the rock particles formed during drilling are carried into the separator 1 by the air flow they strike the spiral bands 47 and fall to the bottom to collect at opening 97. In addition the turbulence created by bands 47 can force additional rock particles to the bottom wall, out of the main air flow. The smaller dust-like rock particles are separated from the air flow by screens 81, 83, 85. As a result, the air leaving separator 1 through outlet 25 carries very little dust with it.

When the twisted bands 47 are made from suitable resilient material, they operate very efficiently under wet conditions. The bands vibrate and rotate back and forth during operation due to the air flow resulting in a self-cleaning action. In addition, rock particles striking the resilient bands tend to knock or shake off wet dust particles before they can accumulate. The resilient bands 47 also give during operation and thus do not wear out as quickly as rigid baffles would.

A separator 1 with one set of deflector means 45 has been described. As shown in FIG. 1, however, the separator can have a second set of deflector means 45a located behind the first deflector set 45 and in front of the first screen 81. The bands 47a and the second deflector set 45a are similar to the bands 47 in the first set 45 and are mounted in a similar manner. Bands 47a preferably are narrower however than bands 47 and thus can be more closely spaced together to provide separation of finer particles than bands 47.

As previously stated, the twisted bands 47 are preferably made from resilient material. They can however also be made from flexible material such as thin metal strips. If made from metal strips however, whether rigid or flexible, it is preferred that the strips be covered with a resilient material, such as rubber, to increase their operational life.

The frames 53 are, as shown, mounted generally perpendicular to the direction of air flow. They can however be tilted forward slightly, if desired, to have their top end upstream of their bottom end to assist in the self-cleaning action.

The embodiments of the invention in which an exclusive property or privilege is claimed are defined as follows:

1. An air borne rock separator for use in separating the heavier rock material from an air stream carrying heavy and light rock material, the separator having a housing defining a generally straight air stream path, an inlet at one end of the housing, an outlet at the other end of the housing, at least one set of spirally twisted deflector bands extending across the air stream path in a plane generally perpendicular to the air stream path, the bands made of material strong enough to normally intercept and deflect the heavier rock material, at least the outer portion of the bands composed of resilient material of sufficient thickness to allow the bands to give slightly when struck by heavier rock material so as to increase their operational life, and including at least one screen mounted in the housing extending across said air stream path downstream from said deflector bands.

2. A separator as claimed in claim 1 wherein the bands are mounted at their ends in spaced-apart relation in a frame, and mounting means within the housing for removably mounting the frame.

3. A separator as claimed in claim 2 wherein the frame is removably mounted in the mounting means with the bands extending vertically.

4. A separator as claimed in claim 1 including a further outlet at the bottom of the housing for the deflected material.

5. A separator as claimed in claim 1 wherein the bands are made entirely from resilient material.

6. A separator as claimed in claim 1 wherein the bands are made from flexible metallic material coated with resilient material.

* * * * *